United States Patent
Hu et al.

(10) Patent No.: US 11,773,466 B2
(45) Date of Patent: Oct. 3, 2023

(54) STEEL FOR WIND POWER GEAR WITH IMPROVED PURITY AND RELIABILITY, AND SMELTING METHOD THEREFOR

(71) Applicant: DAYE SPECIAL STEEL CO., LTD., Hubei (CN)

(72) Inventors: Mengdi Hu, Hubei (CN); Yinghua Lei, Hubei (CN); Zhou Zhang, Hubei (CN); Ruihai Hu, Hubei (CN); Wenchao Zheng, Hubei (CN); Zhanzhong Wang, Hubei (CN); Lixin Zhou, Hubei (CN); Guanghui Liu, Hubei (CN)

(73) Assignee: DAYE SPECIAL STEEL CO., LTD., Hubei (CN)

( * ) Notice: Subject to any disclaimer, the term of this patent is extended or adjusted under 35 U.S.C. 154(b) by 0 days.

(21) Appl. No.: 17/792,473

(22) PCT Filed: Nov. 23, 2021

(86) PCT No.: PCT/CN2021/132372
§ 371 (c)(1),
(2) Date: Jul. 13, 2022

(87) PCT Pub. No.: WO2022/083787
PCT Pub. Date: Apr. 28, 2022

(65) Prior Publication Data
US 2023/0054329 A1    Feb. 23, 2023

(30) Foreign Application Priority Data
Dec. 31, 2020  (CN) .......................... 202011632275.9

(51) Int. Cl.
| | | |
|---|---|---|
| *C22B 9/18* | (2006.01) | |
| *C22C 38/32* | (2006.01) | |
| *C22C 38/06* | (2006.01) | |
| *C22C 38/38* | (2006.01) | |
| *C21C 7/10* | (2006.01) | |
| *C22B 1/00* | (2006.01) | |
| *C22B 9/00* | (2006.01) | |
| *C22B 9/04* | (2006.01) | |
| *C22B 9/10* | (2006.01) | |
| *C22C 38/04* | (2006.01) | |
| *C22C 38/44* | (2006.01) | |

(52) U.S. Cl.
CPC .............. *C22B 9/18* (2013.01); *C22B 1/005* (2013.01); *C22B 9/006* (2013.01); *C22B 9/04* (2013.01); *C22B 9/106* (2013.01); *C22C 38/04* (2013.01); *C22C 38/06* (2013.01); *C22C 38/44* (2013.01)

(58) Field of Classification Search
None
See application file for complete search history.

(56) References Cited

U.S. PATENT DOCUMENTS

| | | | |
|---|---|---|---|
| 4,157,258 A | 6/1979 | Philip et al. | |
| 4,946,645 A | 8/1990 | Namiki et al. | |

FOREIGN PATENT DOCUMENTS

| | | | | |
|---|---|---|---|---|
| CN | 101713050 A | 5/2010 | | |
| CN | 102424934 A | 4/2012 | | |
| CN | 106312000 A | 1/2017 | | |
| CN | 108531804 A | 9/2018 | | |
| CN | 110066904 A | * 7/2019 | ............... | C21C 5/52 |
| CN | 112853206 A | 5/2021 | | |
| CN | 112853206 B | 11/2021 | | |

OTHER PUBLICATIONS

Chinese Office Action issued in Chinese Patent Application No. 202011632275.9 dated Jul. 30, 2021.
International Search Report issued in International Patent Application PCT/CN2021/132372 dated Feb. 16, 2022.
Notification of Grant of Invention Patent in CN202011632275.9, dated Oct. 11, 2021.
Shao, Shuyan et al., "18CrMnNiMoA (A Study on Processing About Carbonitriding Pinion Steel for Heavey Load)", Materials Research and Application, vol. 4, No. 3, Sep. 30, 2010.
Written Opinion issued in International Patent Application PCT/CN2021/132372 dated Feb. 16, 2022.

* cited by examiner

*Primary Examiner* — Jenny R Wu
(74) *Attorney, Agent, or Firm* — United IP Counselors, LLC

(57) ABSTRACT

Provided is steel for a wind power gear with improved purity and reliability. The chemical components thereof comprise, in percentages by mass: 0.15-0.19% of C, ≤0.4% of Si, 0.5-0.7% of Mn, ≤0.012% of P, ≤0.006% of S, 1.5-1.8% of Cr, 0.28-0.35% of Mo, 1.4-1.7% of Ni, and 0.02-0.04% of Al, with the balance being Fe and inevitable impurities. A smelting method therefor comprises adding raw materials to a converter for primary melting, transferring same to a refining furnace for refining, carrying out continuous casting after vacuum degassing, and transferring same to a gas protection furnace for electroslag remelting. According to the present invention, a pure electroslag master batch is obtained by continuous casting, and the purity of the material is further improved by means of an electroslag remelting procedure; and the prepared steel material is used in a wind power gear, such that the flaw detection pass rate is significantly increased, large-particle inclusions in the steel material are significantly reduced, and the inclusions are fine and dispersed.

10 Claims, 2 Drawing Sheets ns in steel. In addition, there are still various problems in the production and use of the gear of wind power gearbox that have not been effectively solved, such as easy breakage caused by high detection failure of flaw detection rate and short gear fatigue life. Therefore, it is necessary to provide an improved technical solution for the above-mentioned deficiencies of the prior art, and to find a gear material with high purity and high reliability, which has become a trend in the development of the wind power industry in the future.

STEEL FOR WIND POWER GEAR WITH IMPROVED PURITY AND RELIABILITY, AND SMELTING METHOD THEREFOR

BACKGROUND

Field of the Invention

The present invention belongs to the technical field of metal smelting, and in particular relates to A steel for wind power gear with improved purity and reliability, and smelting method therefor.

Background of the Invention

At present, the domestic wind power industry is developing rapidly. Wind turbines are often installed in areas with harsh natural conditions such as the Gobi, desert, and ocean. If the gearbox fails, maintenance is extremely difficult, so its reliability requirements are much higher than that of general machinery. The cost of gearbox usually accounts for 15%-20% of the total cost of wind power equipment, and its research and development is the core of wind power technology.

The industry has put forward higher requirements for the purity and service life of wind power gear materials, as well as the maintenance and replacement cycle of transmission gearboxes. Gear are the core material in the gearbox, and the factors such as purity and density determine the service life of the gear. The service life of the gear often determines the overall life of a wind turbine gearbox.

The gear materials of the existing wind power gearboxes come from electric furnace mold ingots. The process route is "electric furnace smelting-external refining-vacuum degassing-casting steel ingots". After years of development, this process has become mature, but at present, there are two problems that have not been effectively solved in the process of electric furnace ingot steelmaking: the refractory materials are easily eroded and fall into the molten steel to form exogenous inclusions during the steelmaking process; the smelting process can not be in the whole process of gas protection, which is easy to formed endogenous inclusions. Therefore, its purity cannot be effectively guaranteed, which makes it difficult to completely avoid large-particle inclusions in steel. In addition, there are still various problems in the production and use of the gear of wind power gearbox that have not been effectively solved, such as easy breakage caused by high detection failure of flaw detection rate and short gear fatigue life. Therefore, it is necessary to provide an improved technical solution for the above-mentioned deficiencies of the prior art, and to find a gear material with high purity and high reliability, which has become a trend in the development of the wind power industry in the future.

SUMMARY

The purpose of the present invention is to provide A steel for wind power gear with improved purity and reliability, and smelting method therefor, in order to overcome the problem that the purity of the steel cannot be guaranteed due to the formation of inclusions in the steelmaking process in the above-mentioned prior art. The smelted steel is used for wind power gear, which greatly improves the qualification rate of flaw detection of wind power gear and the fatigue life of gear.

In order to achieve the above object, the present invention provides the following technical solutions:

A steel for wind power gear with improved purity and reliability, the chemical component of the steel for wind power gear, in terms of mass percentage, comprises, C: 0.15~0.19%, Si≤0.4%, Mn: 0.5~0.7%, P≤0.012%, S≤0.006%, Cr: 1.5~1.8%, Mo: 0.28~0.35%, Ni: 1.4~1.7%, Al: 0.02~0.04%, and the balance is Fe and unavoidable impurities.

The above-mentioned smelting method of the steel for wind power gear with improved purity and reliability, as a preferred solution, the smelting method comprises the following steps of:

Step S1, Primary Smelting:

Adding raw materials of molten iron and scrap steel to a converter according to the ratio for primary smelting to obtain primary molten steel;

Step S2, Refining:

Hanging molten iron ladle which contains the primary molten steel obtained in step S1 into a refining furnace, then adding premelted refining slag and performing refining, and regulating the components in the molten steel to obtain a refined molten steel;

Step S3, Vacuum Degassing:

Subjecting the refined molten steel obtained in step S2 to a vacuum degassing treatment to remove hydrogen and oxygen in the molten steel;

Step S4, Continuous Casting:

Hanging the ladle after vacuum degassing in step S3 into a continuous casting ladle for proceeding slag discharge detection, long nozzle inert gas protection and submerged nozzle protection, tundish inert gas protection, tundish covering slag, continuous temperature measurement, casting protection with a crystallizer pre-melted slag, automatical the liquid level control, crystallizer electromagnetic stirring, dynamical water control in the secondary cooling zone, end section electromagnetical stirring, and obtaining a continuous casting blank at a constant temperature and constant pulling rate;

Step S5, Electroslag Remelting in the Gas Shielded Furnace:

Placing the continuous casting blank obtained in step S4 into an electroslag furnace, the electroslag furnace being provided with a gas protection device, charging a protective gas from the gas protection device, then adding a slag charge, igniting, smelting and feeding after slag melting, so as to obtain a steel for wind power gear with improved purity and reliability.

The above-mentioned smelting method of the steel for wind power gear with improved purity and reliability, as a preferred solution, in step S1, the molten iron needs to be desulfurized by KR desulfurization equipment before being added into the converter, and the mass percentage of sulfur in desulphurized molten iron is less than or equal to 0.003%.

The above-mentioned smelting method of the steel for wind power gear with improved purity and reliability, as a preferred solution, in step S1, a mass percentage of the molten iron in the raw material is 80-90%, and the balance is scrap steel;

preferably, the scrap steel is high-quality scrap steel, and impurities in the scrap steel comprise, by mass percentage, As≤0.04%, Sn≤0.03%, Pb≤0.002%, Sb≤0.005%, Cu≤0.20%, Ti≤0.0005%; the scrap steel meets an radiation less than or equal to 0.15 μSv/h or an radioactivity less than or equal to 0.1 Bq/g.

The above-mentioned smelting method of the steel for wind power gear with improved purity and reliability, as a preferred solution, a mass percentage of Ti in the primary molten steel obtained in step S1 is less than or equal to 0.002%, a mass percentage of Ca is less than or equal to 0.001%.

The above-mentioned smelting method of the steel for wind power gear with improved purity and reliability, as a preferred solution, the main components of the premelted refining slag in step S2 include $Al_2O_3$ and $CaF_2$;

preferably, the grades of inclusions in the refined molten steel obtained in step S2 reach A fine less than or equal to 1.5 grade, A coarse less than or equal to 0.5 grade, B fine less than or equal to 1.0 grade, B coarse less than or equal to 0.5 grade, C fine equal to 0 grade, C coarse equal to 0 grade, D fine less than or equal to 1.0 grade, D coarse less than or equal to 1.0 grade, and DS less than or equal to 1.0 grade.

The above-mentioned smelting method of the steel for wind power gear with improved purity and reliability, as a preferred solution, the vacuum degassing treatment in step S3 adopts RH vacuum cycle degassing to achieve a degree of vacuum less than or equal to 67 Pa;

after the vacuum degassing treatment, a mass percentage of hydrogen in the molten steel is less than 1.0 ppm, and a mass percentage of oxygen in the molten steel is less than or equal to 5.0 ppm.

The above-mentioned smelting method of the steel for wind power gear with improved purity and reliability, as a preferred solution, the constant temperature and constant pulling rate in step S4 is specifically that temperature is 1500-1600° C. and pulling rate is 0.20~0.28 m/min;

preferably, central shrinkage cavity of the continuous casting blank obtained in the step S4 are not greater than 1.0 grade;

more preferably, the grades of the internal inclusions of the continuous casting blank are: class A inclusions less than or equal to 1.5 grade, class B inclusions less than or equal to 1.0 grade, class C inclusions less than or equal to 0.5 grade, class D inclusions less than or equal to 1.0 grade.

The above-mentioned smelting method of the steel for wind power gear with improved purity and reliability, as a preferred solution, the slag charge added during electroslag remelting in the step S5 is a binary slag system, and the binary slag system is composed of Ca compounds and Al compounds;

preferably, the binary slag system is a $CaF_2$ and $Al_2O_3$ slag system, and mass ratio of $CaF_2$ and $Al_2O_3$ is 7:3.

The above-mentioned smelting method of the steel for wind power gear with improved purity and reliability, as a preferred solution, the melting rate of the smelting in the step S5 is 12-15 kg/min;

preferably, protective gas charged in the step S5 is argon gas or nitrogen gas;

preferably, the protective gas charged in the step S5 is argon gas.

Compared with the closest prior art, the technical solution provided by the present invention has the following excellent effects:

The smelting method in the present invention is changed from "electric furnace smelting+die casting" to "converter smelting+continuous casting" on the basis of the existing process, and the process of "electroslag remelting in the gas shielded furnace" is added at the same time. A pure electroslag masterbatch is obtained by adopting the continuous casting process. An electroslag remelting process is added after continuous casting to further improve the purity of the material. During the electroslag remelting process, the liquid metal is covered by the slag pool to avoid re-oxidation, and at the same time, it is melted, refined and solidified in water-cooled crystallizer to prevents the contamination of the steel by the refractory materials. Before the steel ingot is solidified, there is a molten metal pool and a slag pool at its upper end, which play the role of heat preservation and feeding to ensure the compactness of the steel ingot. The electroslag remelting is carried out under a protective atmosphere of the inert gas, and corresponding auxiliary equipment (Double-layered smoke hood of gas protection electric slag furnace) is added on the basis of the existing equipment at the same time, which enhances the effect of gas shielding and effectively avoids the excessive burning loss of the easy-to-burn alloy elements, so that it can be controlled within a relatively narrow range, and at the same time, the generation of endogenous inclusions is avoided.

The steel material prepared by the smelting method of the present invention is used for wind power gear, and has excellent flaw detection performance after use. Compared with the smelting process of "electric furnace smelting+die casting" in the prior art before the process change, the qualified rate of flaw detection has been significantly improved, and the production efficiency also has been improved. Compared with the smelting process of "electric furnace smelting+die casting" in the prior art, the large particle inclusions in the steel material prepared by the smelting method of the present invention are significantly reduced through ASPEX scanning Compared with the smelting process of "electric furnace smelting+die casting" in the prior art, the inclusions in the steel material prepared in the present invention are more fine and dispersed, which is observed under a high-power microscope. Compared with the smelting process of "electric furnace smelting+die casting" in the prior art, the low-magnification structure of the steel material prepared in the present invention is more dense after the comparison of the low-magnification structure of pickling.

BRIEF DESCRIPTION OF THE DRAWINGS

The accompanying drawings forming a part of the present application are used to provide further understanding of the present invention, and the exemplary examples of the present invention and their descriptions are used to explain the present invention and do not constitute an improper limitation of the present invention. Wherein.

DETAILED DESCRIPTION OF THE EMBODIMENTS

Figure 1:
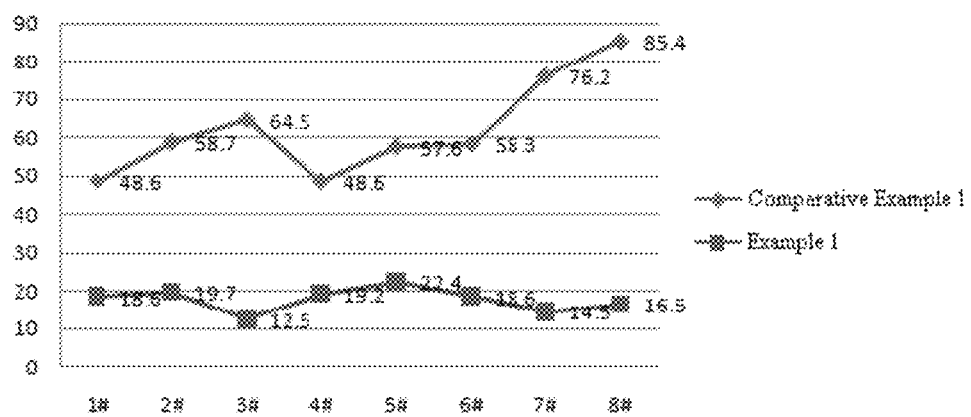
FIG. 1 is a comparison diagram of ASPEX scanning test results of the size of the largest inclusions in the steel for wind power gear smelted in the specific example 1 and comparative example 1 of the present invention.

The technical solutions in the embodiments of the present invention will be clearly and completely described below.

Obviously, the described embodiments are only a part of the embodiments of the present invention, rather than all the embodiments. Based on the embodiments in the present invention, all other embodiments obtained by those of ordinary skill in the art fall within the protection scope of the present invention.

The present invention will be described in detail below with reference to the accompanying drawings and in conjunction with the embodiments. It should be noted that the embodiments of the present invention and the features of the embodiments may be combined with each other under the condition of no conflict.

The smelting method of the steel for wind power gear with improved purity and reliability in the present invention is changed from "electric furnace smelting+die casting" to "converter smelting+continuous casting" on the basis of the existing process, and the process of "electroslag remelting in the gas shielded furnace" is added at the same time. During the electroslag remelting process, the liquid metal is covered by the slag pool to avoid re-oxidation, and at the same time, it is melted, refined and solidified in water-cooled crystallizer to prevents the contamination of the steel by the refractory materials. Before the steel ingot is solidified, there is a molten metal pool and a slag pool at its upper end, which play the role of heat preservation and feeding to ensure the compactness of the steel ingot. The electroslag remelting is carried out under a protective atmosphere of the inert gas, and corresponding auxiliary equipment (Double-layered smoke hood of gas protection electric slag furnace) is added on the basis of the existing equipment at the same time, which enhances the effect of gas shielding and effectively avoids the excessive burning loss of the easy-to-burn alloy elements, so that it can be controlled within a relatively narrow range, and at the same time, the generation of endogenous inclusions is avoided.

The present invention provides a steel for wind power gear with improved purity and reliability, the chemical component of the steel for wind power gear, in terms of mass percentage, C: 0.15~0.19% (such as 0.15%, 0.155%, 0.16%, 0.165%, 0.17%, 0.175%, 0.18%, 0.185%, 0.19%), Si≤0.4% (such as 0%, 0.05%, 0.1%, 0.15%, 0.2%, 0.25%, 0.3%, 0.35%, 0.4%), Mn: 0.5~0.7% (such as 0.5%, 0.55%, 0.6%, 0.65%, 0.7%), P≤0.012% (such as 0, 0.002%, 0.004%, 0.006%, 0.008%, 0.01%, 0.012%), S≤0.006% (such as 0, 0.001%, 0.002, 0.003, 0.004, 0.005, 0.006), Cr: 1.5~1.8% (such as 1.5%, 1.55%, 1.6%, 1.65%, 1.7%, 1.75%, 1.8%), Mo: 0.28~0.35% (such as 0.28%, 0.29%, 0.30%, 0.31%, 0.32%, 0.33%, 0.34%, 0.35%), Ni: 1.4~1.7% (such as 1.4%, 1.45%, 1.5%, 1.55%, 1.6%, 1.65%, 1.7%), Al: 0.02~0.04% (such as 0.02%, 0.025%, 0.03%, 0.035%, 0.04%), and the balance is Fe and unavoidable impurities.

In order to better understand the steel for wind power gear with improved purity and reliability in the present invention, the present invention further provides a smelting method of the steel for wind power gear with improved purity and reliability, the smelting method comprising the following steps of:

Step S1, Primary Smelting:

Adding raw materials of molten iron and scrap steel to a converter according to the ratio for primary smelting to obtain primary molten steel. Wherein, converter steelmaking uses molten iron, scrap steel and the like as the main raw materials, without the aid of external energy, and relies on the physical heat of the molten iron itself and the heat generated by chemical reaction between the components of the molten iron to complete the steelmaking process in the converter.

In a specific embodiment of the present invention, in step S1, the molten iron needs to be desulfurized by KR desulfurization equipment before being added into the converter, and the mass percentage of sulfur in desulphurized molten iron is less than or equal to 0.003% (such as 0.0005%, 0.001%, 0.0015%, 0.002%, 0.0025%, 0.003%). Wherein, the KR desulfurization equipment adopts a stirring paddle with ventilation and stirring function and makes the stirring paddle enter the molten iron ladle weld pool to a certain depth, the whirlpool generated by its rotation is used to introduce the weighed desulfurizer to the surface of the molten iron from the feeder, and it is swept into the molten iron by the whirlpool to make the calcium oxide-based desulfurization powder fully contact and react with the molten iron to achieve the purpose of desulfurization.

Preferably, the molten iron is hot charged in a large blast furnace of 1780 $m^3$.

In a specific embodiment of the present invention, in step S1, the mass percentage of molten iron in the raw material is 80-90% (such as 80%, 82%, 84%, 86%, 88%, 90%), and the balance is scrap steel.

Preferably, the scrap steel is high-quality scrap steel, and impurities in the scrap steel comprise, by mass percentage, As≤0.04% (such as 0.005%, 0.01%, 0.015%, 0.02%, 0.025%, 0.03%, 0.035%, 0.04%), Sn≤0.03% (such as 0.005%, 0.01%, 0.015%, 0.02%, 0.025%, 0.03%), Pb≤0.002% (such as 0.0005%, 0.001%, 0.0015%, 0.002%), Sb≤0.005% (such as 0.0005%, 0.001%, 0.0015%, 0.002%, 0.0025%, 0.003%, 0.0035%, 0.004%, 0.0045%), Cu≤0.20% (such as 0.01%, 0.03%, 0.05%, 0.1%, 0.15%, 0.17%, 0.2%), Ti≤0.0005% (such as 0.0001%, 0.0002%, 0.0003%, 0.0004%, 0.0005%); the scrap steel meets an radiation less than or equal to 0.15 μSv/h (such as 0.02 μSv/h, 0.04 μSv/h, 0.06 μSv/h, 0.08 μSv/h, 0.1 μSv/h, 0.12 μSv/h, 0.14 μSv/h, 0.15 μSv/h) or an radioactivity less than or equal to 0.1 Bq/g (such as 0.01 Bq/g, 0.02 Bq/g, 0.03 Bq/g, 0.04 Bq/g, 0.05 Bq/g, 0.06 Bq/g, 0.07 Bq/g, 0.08 Bq/g, 0.09 Bq/g).

In a specific embodiment of the present invention, a mass percentage of Ti in the primary molten steel obtained in step S1 is less than or equal to 0.002% (such as 0.005%, 0.01%, 0.015%, 0.02%), a mass percentage of Ca is less than or equal to 0.001% (such as 0.0002%, 0.0004%, 0.0006%, 0.0008%, 0.001%).

Step S2, Refining:

Hanging molten iron ladle which contains the primary molten steel obtained in step S1 into a refining furnace, then adding premelted refining slag and performing refining, and regulating the components in the molten steel to obtain a refined molten steel. Wherein, controlling the composition of molten steel is to fine-tune the composition of molten steel by accurately calculating the amount of alloy material to be added.

In a specific embodiment of the present invention, the main components of the premelted refining slag in step S2 include $Al_2O_3$ and $CaF_2$; the premelted refining slag is used for adsorbing inclusions in molten steel.

The melting point of the premelted refining slag is very low, which can be melted at the fastest speed, shortening the residence time of molten steel in the refining ladle, and strengthening the smelting process. the premelted refining slag selects various raw materials for sintering or melting to generate minerals mainly $12CaO \cdot 7Al_2O_3$, the content of which is greater than 85%, and a large amount of calcified components can react with oxygen and sulfur in molten steel to form products with low melting points and easy to float, reduce the content of harmful elements and impurities in steel grade, and achieve the purpose of purifying molten steel. In ladle refining, adding the premelted refining slag can effectively shorten the steelmaking time, has a strong ability to absorb non-metallic inclusions in steel, and has a significant effect on purifying molten steel.

More preferably, the grades of inclusions in the refined molten steel obtained in step S2 reach A fine less than or equal to 1.5 grade, A coarse less than or equal to 0.5 grade, B fine less than or equal to 1.0 grade, B coarse less than or equal to 0.5 grade, C fine equal to 0 grade, C coarse equal to 0 grade, D fine less than or equal to 1.0 grade, D coarse less than or equal to 1.0 grade, and DS less than or equal to 1.0 grade.

The evaluation method of non-metallic inclusions in steel can refer to the standard of GB/T10561-2005. In the present invention, the JK standard rating is adopted, and the inclusions are divided into four basic types: A, B, C and D, which are sulfide, alumina, silicate and spherical oxide respectively. Each type of inclusion is divided into two series: fine series and coarse series, classified according to the difference of thickness and diameter, and each inclusion is composed of five grades (1~5) with increasing number of identified inclusions. Wherein, when evaluating the inclusion level, half-level is allowed, and the result is expressed by the number of levels of the worst field of view for each type of inclusion in each sample.

Step S3, Vacuum Degassing:

Subjecting the refined molten steel obtained in step S2 to a vacuum degassing treatment to remove hydrogen and oxygen in the molten steel.

In a specific embodiment of the present invention, the vacuum degassing treatment in step S3 adopts RH vacuum cycle degassing to achieve a degree of vacuum less than or equal to 67 Pa; under normal circumstances, the time of vacuum degassing treatment in step S3 needs to exceed 20 min (such as 20 min, 22 min, 24 min, 26 min, 28 min, 30 min, 32 min, 34 min, 36 min, 38 min, 40 min).

After the vacuum degassing treatment, the mass percentage of hydrogen in the molten steel is less than 1.0 ppm (such as 0.1 ppm, 0.2 ppm, 0.3 ppm, 0.4 ppm, 0.5 ppm, 0.6 ppm, 0.7 ppm, 0.8 ppm, 0.9 ppm), and the mass percentage of oxygen in the molten steel is less than or equal to 5.0 ppm (such as 0.5 ppm, 1 ppm, 1.5 ppm, 2 ppm, 2.5 ppm, 3 ppm, 3.5 ppm, 4 ppm, 4.5 ppm, 4.8 ppm).

Step S4, Continuous Casting:

Hanging the ladle after vacuum degassing in step S3 into a continuous casting ladle for proceeding slag discharge (slagging) detection, long nozzle inert gas protection and submerged nozzle protection (the submerged type prevents the molten steel from contacting with air), tundish inert gas protection, tundish covering slag, continuous temperature measurement, casting protection with a crystallizer premelted slag, automatical the liquid level control, crystallizer electromagnetic stirring, dynamical water control in the secondary cooling zone, end section electromagnetical stirring, and obtaining a continuous casting blank at a constant temperature and constant pulling rate. Wherein, the inert gas is preferably argon gas.

The continuous casting in step S4 uses the tundish induction heating measure, and the whole continuous casting process realizes constant temperature and constant pulling rate.

In a specific embodiment of the present invention, in step S4, the tundish inert gas protection is to use argon gas for gas protection;

The tundish covering slag is a tundish covering agent, and its main components include magnesium oxide, silicon dioxide and silicon oxide. The tundish covering agent is mainly used for thermal insulation, adsorption of floating inclusions in steel, and air isolation to prevent secondary oxidation of molten steel.

In a specific embodiment of the present invention, the constant temperature constant pulling rate in step S4 is specifically that temperature is 1500-1600° C. (such as 1510° C., 1520° C., 1530° C., 1540° C., 1550° C., 1560° C., 1570° C., 1580° C., 1590° C.) and pulling rate is 0.20-0.28 m/min (such as 0.21 m/min, 0.22 m/min, 0.23 m/min, 0.24 m/min, 0.25 m/min, 0.26 m/min, 0.27 m/min).

In a specific embodiment of the present invention, the central shrinkage of the continuous casting blank obtained in step S4 is not greater than 1.0 grade;

The surface of continuous casting slab is not allowed to have defects such as transverse crack, slag pit and heavy crust; the grades of the internal inclusions of the continuous casting blank are: class A inclusions less than or equal to 1.5 grade, class B inclusions less than or equal to 1.0 grade, class C inclusions less than or equal to 0.5 grade, class D inclusions less than or equal to 1.0 grade.

Step S5, Electroslag Remelting in the Gas Shielded Furnace:

Placing the continuous casting blank obtained in step S4 into an electroslag furnace, the electroslag furnace being provided with a gas protection device, charging a protective gas from the gas protection device, then adding a slag charge, igniting, smelting and feeding after slag melting, so as to obtain a steel for wind power gear with improved purity and reliability.

Electroslag remelting is a secondary refining technology, which is a comprehensive metallurgical casting process combining secondary refining and directional solidification of molten steel. The principle is that the current passes through the liquid slag pool slag heat resistance, melts the metal electrode, and the molten metal gathers into molten droplets. When dripping, it enters the metal molten pool through the slag layer, and then crystallizes and solidifies into a steel ingot in a water-cooled crystallizer.

In a specific embodiment of the present invention, during the electroslag remelting process, the liquid metal is covered by the slag pool to avoid re-oxidation, and at the same time, it is melted, refined and solidified in the water-cooled crystallizer, thus preventing the contamination of the steel by the refractory material. Before the steel ingot is solidified, there are metal molten pool and slag pool at its upper end, which play a role of heat preservation and feeding, and ensure the compactness of the steel ingot.

In addition, in the present invention, argon gas is selected as a protective gas, while corresponding auxiliary equipment is added to the equipment. By using the "Double-layered smoke hood of gas protection electric slag furnace" with the application number of 201320698946.0, which enhances the effect of gas shielding and effectively avoids the excessive burning loss of the easy-to-burn alloy elements, so that it can be controlled within a relatively narrow range, and at the same time, the generation of endogenous inclusions is avoided.

In a specific embodiment of the present invention, the slag charge added during electroslag remelting in step S5 is a binary slag system, and the binary slag is composed of Ca compounds and Al compounds.

Preferably, the binary slag system is a $CaF_2$ and $Al_2O_3$ slag system, and a mass ratio of $CaF_2$ and $Al_2O_3$ is 7:3.

More preferably, the frequency of the power in the electroslag remelting in step S5 is 10-12 Hz (such as 10 Hz, 10.5 Hz, 11 Hz, 11.5 Hz, 12 Hz). Since the power frequency has an impact on the crystallization quality of the ingot, low frequency is good for the crystallization of the ingot, but it will increase the oxygen content in the ingot, therefore, the frequency of the power supply needs to be strictly controlled during the electroslag remelting process.

In a specific embodiment of the present invention, a melting rate of the smelting in step S5 is 12-15 kg/min (such as 12.5 kg/min, 13 kg/min, 13.5 kg/min, 14 kg/min, 14.5 kg/min). Wherein, in order to maintain the stability of the melting rate during the smelting process, it is necessary to automatical adjust the pressure step by step according to the actual usage. In a specific embodiment of the present invention, the protective gas charged in step S5 is argon gas or nitrogen gas.

Preferably, the protective gas charged in step S5 is argon gas.

The impurities in the scrap steel used in the following examples and comparative examples, calculated by mass percentage, include As≤0.04%, Sn≤0.03%, Pb≤0.002%, Sb≤0.005%, Cu≤0.20%, Ti≤0.0005%; and at the same time, the scrap steel meets an radiation less than or equal to 0.15 μSv/h or an radioactivity less than or equal to 0.1 Bq/g.

Example 1

This example provides a steel for wind power gear with improved purity and reliability, the chemical component of the steel for wind power gear, in terms of mass percentage, C: 0.17%, Si≤0.3%, Mn: 0.6%, P≤0.01%, S≤0.006%, Cr: 1.6%, Mo: 0.30%, Ni: 1.5%, Al: 0.03%, and the balance is Fe and unavoidable impurities.

In this example, a forging plant A adopts a smelting method of a steel for wind power gear with improved purity and reliability to manufacture a steel for wind power gear. The specific smelting method includes the following steps:

Step S1, Primary Smelting:

The molten iron is charged in a 1780 $m^3$ large blast furnace hot metal, and desulfurized until the mass percentage of S in the molten iron is less than or equal to 0.003%, and then the desulfurized molten iron and high-quality scrap steel are added in a mass ratio of 8:2 (the mass percentage of molten iron in raw material is 80%, and the balance is high-quality scrap steel) into the converter for primary smelting to obtain primary molten steel;

Step S2, Refining:

Hanging molten iron ladle which contains the primary molten steel obtained in step S1 into a refining furnace, then adding premelted refining slag and performing refining, fine-tuning and controlling the components in the molten steel by ladle refining to obtain a refined molten steel, so that the grades of inclusions in the refined molten steel reach A fine less than or equal to 1.5 grade, A coarse less than or equal to 0.5 grade, B fine less than or equal to 1.0 grade, B coarse less than or equal to 0.5 grade, C fine equal to 0 grade, C coarse equal to 0 grade, D fine less than or equal to 1.0 grade, D coarse less than or equal to 1.0 grade, and DS less than or equal to 1.0 grade;

Step S3, Vacuum Degassing:

Subjecting the refined molten steel obtained in step S2 to RH vacuum circulation degassing treatment so that the mass percentage of hydrogen in the molten steel is less than 1.0 ppm and the mass percentage of oxygen in the molten steel is less than or equal to 5.0 ppm;

Step S4, Continuous Casting:

Hanging the ladle after vacuum degassing in step S3 into a continuous casting ladle for proceeding slag discharge detection, long nozzle argon gas protection and submerged nozzle protection, tundish gas protection, tundish covering slag, continuous temperature measurement, casting protection with a crystallizer pre-melted slag, automatical the liquid level control, crystallizer electromagnetic stirring, dynamical water control in the secondary cooling zone, end section electromagnetical stirring, and obtaining a continuous casting blank at a constant temperature and constant pulling rate that temperature is 1550° C. and pulling rate is 0.24 m/min, the obtained central shrinkage cavity of the continuous casting blank are not greater than 1.0 grade;

Step S5, Electroslag Remelting in Gas Shielded Furnace:

Putting the continuous casting blank obtained in step S4 into an electroslag furnace which is provided with a "Double-layered smoke hood of gas protection electric slag furnace" with the application number of 201320698946.0, filling with argon, and then adding the binary slag system (the mass ratio of $CaF_2$ and $Al_2O_3$ is 7:3) at a frequency of 10 Hz, igniting, smelting at the smelting rate of smelting and feeding after slag melting to obtain a steel for wind power gear with improved purity and reliability.

Performance Testing:

A forging plant A uses the steel manufactured by the smelting method in this example for the production of wind power gearboxes, and conducts a flaw detection test on it. The results show that when the detection amount is 1,000 pieces, the number of flat-bottom holes 0.8 FBH that meet the flaw detection is 997. That is, the qualified rate of flat bottom holes 0.8 FBH that meet the flaw detection is 99.7%.

Take 8 points along the diameter direction of the circular section of the steel manufactured in this example and mark them as 1 #, 2 #, 3 #, 4 #, 5 #, 6 #, 7 #, 8 #, respectively, and then performing the ASPEX scanning. The results is shown in FIG. 1 that the size of the largest inclusion in the steel produced in this example was small and much smaller than that in Comparative Example 1.

Figure 2:
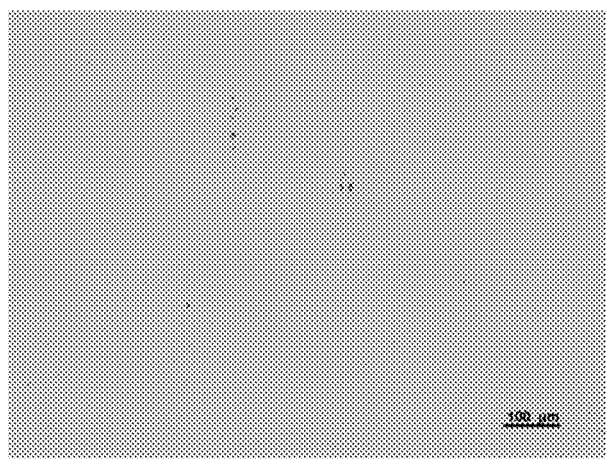
FIG. 2 is the morphology of the steel material for wind power gear in the specific example 1 of the present invention under a high-power microscope.

The steel produced in this example is observed under a microscope of 1000 times magnification, and the result is shown in FIG. 2 that the inclusions in the steel produced in this example were more fine and dispersed.

Figure 4:
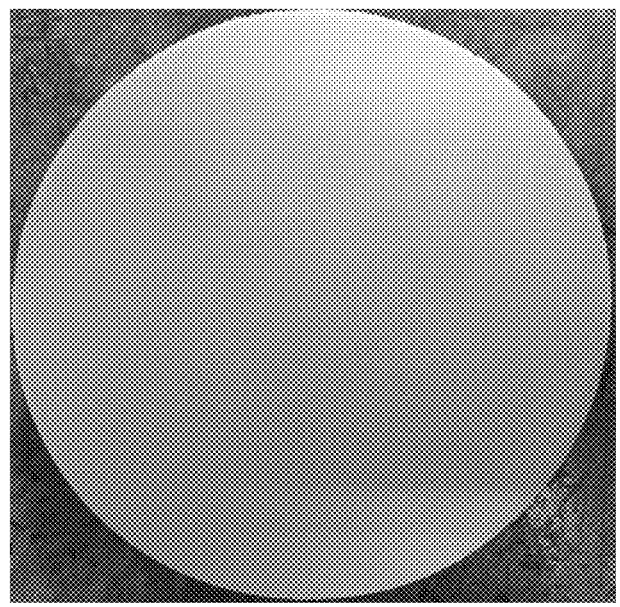
FIG. 4 is a low-magnification microstructure diagram of the steel material for wind power gear in the specific example 1 of the present invention after pickling.

The acid-washed low-magnification structure (macrostructure) of the steel produced in this example is compared, and the result is shown in FIG. 4 that the low-magnification structure of the steel prepared in this example was denser.

Example 2

This example provides a steel for wind power gear with improved purity and reliability, the chemical component of the steel for wind power gear, in terms of mass percentage, C: 0.15%, Si≤0.4%, Mn: 0.5%, P≤0.012%, S≤0.006%, Cr: 1.5%, Mo: 0.28%, Ni: 1.4%, Al: 0.02%, and the balance is Fe and unavoidable impurities.

In this example, a forging plant B adopts a smelting method of a steel for wind power gear with improved purity and reliability to manufacture a steel for wind power gear. In the smelting method of this example, the raw materials added in step S1 are the desulfurized molten iron and the high-quality scrap steel, and they are added to the converter according to the mass ratio of 9:1 (the mass percentage of molten iron in the raw material is 90%, and the balance is high-quality scrap steel) for primary smelting to obtain primary molten steel. Other steps are the same as in Example 1, and the description thereof will not be repeated here.

Performance Testing:

A forging plant B uses the steel manufactured by the smelting method in this example for the production of wind power gearboxes, and conducts a flaw detection test on it. The results show that when the detection amount is 1,000 pieces, the number of flat-bottom holes 0.8 FBH that meet the flaw detection is 1,000. Pieces, that is, the qualified rate of flat bottom holes 0.8 FBH that meet the flaw detection is 100%.

Comparative Example 1

This comparative example provides a steel for wind power gear, which is manufactured by a forging plant A using the same raw materials as in Example 1, and using the smelting process of "electric furnace smelting+die casting" in the prior art. The specific smelting process is not repeated here.

The chemical component of the steel for wind power gear manufactured in this comparative example, calculated in mass percentage, includes C: 0.16%, Si≤0.25%, Mn: 0.7%, P≤0.015%, S≤0.010%, Cr: 1.5%, Mo: 0.27%, Ni: 1.52%, Al: 0.035%, the balance is Fe and inevitable impurities.

Performance Testing:

A forging plant A uses the steel manufactured by the smelting method in this comparative example for the production of wind power gearboxes, and conducts a flaw detection test on it. The results show that when the detection amount is 1,000 pieces, the number of flat-bottom holes 0.8 FBH that meet the flaw detection is 876 pieces, that is, the qualified rate of flat bottom holes 0.8 FBH that meet the flaw detection is 87.6%.

Take 8 points along the diameter direction of the circular section of the steel manufactured in this comparative example and mark them as 1 #, 2 #, 3 #, 4 #, 5 #, 6 #, 7 #, 8 #, respectively, and then performing the ASPEX scanning. The results is shown in FIG. 1 that the size of the largest inclusion in the steel produced in this comparative example was larger.

Figure 3:
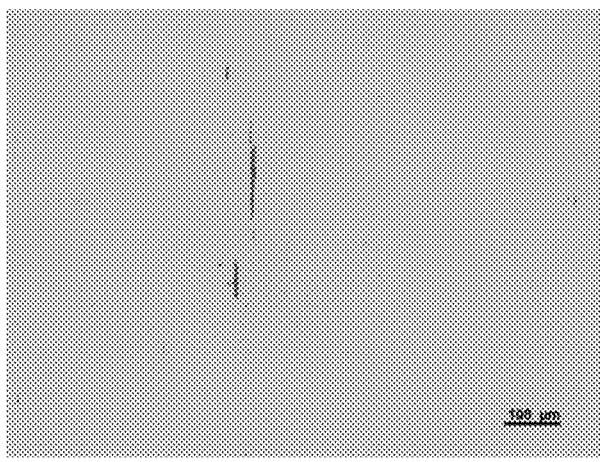
FIG. 3 is the morphology of the steel material for wind power gear in the specific comparative example 1 of the present invention under a high-power microscope.

The steel produced in this comparative example is observed under a microscope of 1000 times magnification, and the result is shown in FIG. 3 that the inclusions in the steel prepared in this comparative example were much larger than those in the steel prepared in Example 1.

Figure 5:
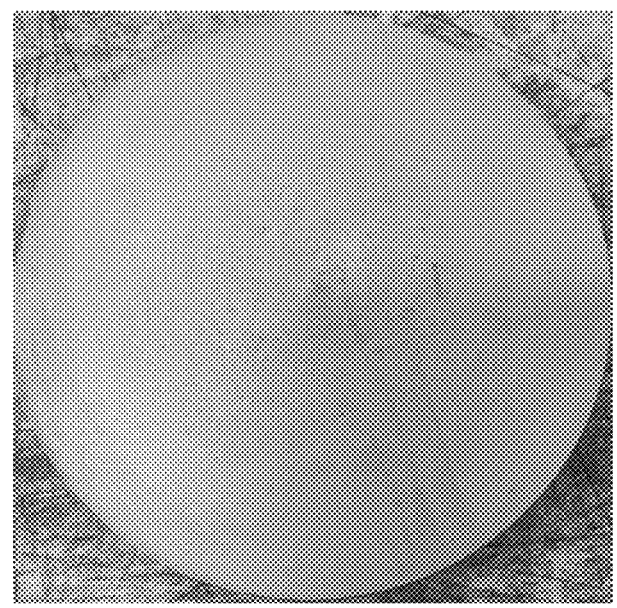
FIG. 5 is a low-magnification microstructure diagram of the steel material for wind power gear in the specific comparative example 1 of the present invention after pickling.

The acid-washed low-magnification structure (macro-structure) of the steel produced in this comparative example is compared, and the result is shown in FIG. 5 that the low-magnification structure of the steel prepared in this example was coarser than that of in the steel prepared in Example 1.

Comparative Example 2

This comparative example provides a steel for wind power gear, which is manufactured by a forging plant A using the same raw materials as in Example 2, and using the smelting process of "electric furnace smelting+die casting" in the prior art. The specific smelting process is not repeated here.

The chemical component of the steel for wind power gear manufactured in this comparative example, calculated in mass percentage, includes C: 0.16%, Si≤0.25%, Mn: 0.65%, P≤0.015%, S≤0.010%, Cr: 1.5%, Mo: 0.29%, Ni: 1.50%, Al: 0.035%, and the balance is Fe and inevitable impurities.

Performance Testing:

A forging plant B uses the steel manufactured by the smelting method in this comparative example for the production of wind power gearboxes, and conducts a flaw detection test on it. The results show that when the detection amount is 1,000 pieces, the number of flat-bottom holes 0.8 FBH that meet the flaw detection is 883 pieces, that is, the qualified rate of flat bottom holes 0.8 FBH that meet the flaw detection is 88.3%.

To sum up, the steel material prepared by the smelting method of the present invention is used for wind power gear, and has superior detection performance of flaw detection after use. Compared with the smelting process of "electric furnace smelting+die casting" in the prior art, the qualification rate of flaw detection has been significantly improved, and the production efficiency has also been improved. Compared with the smelting process of "electric furnace smelting+die casting" in the prior art, the large particle inclusions in the steel material prepared by the smelting method of the present invention are significantly reduced through ASPEX scanning Compared with the smelting process of "electric furnace smelting+die casting" in the prior art, the inclusions in the steel material prepared in the present invention are finer and more dispersed observed under a high magnification microscope. Compared with the smelting process of "electric furnace smelting+die casting" in the prior art, the low-magnification structure of the steel material prepared in the present invention is more dense though the comparison of acid-washed low-magnification structure.

The above descriptions are only preferred embodiments of the present invention, and are not intended to limit the present invention. Any modifications, equivalent replacements, improvements, etc. made within the spirit and principles of the present invention are within the protection scope of the pending claims of the present invention.

What is claimed is:

1. A smelting method for producing purified steel, comprising the following steps:
   a primary smelting step S1, comprising
      adding raw materials of molten iron and scrap steel to a converter in a predetermined ratio for primary smelting to obtain primary molten steel;
   a refining step S2, comprising
      hanging a molten iron ladle containing the primary molten steel obtained in step S1 into a refining furnace, and
      adding premelted refining slag to the primary molten steel and performing refining,
      wherein components in the premelted refining slag, which include primarily $Al_2O_3$ and $CaF_2$, are selected in amounts and proportions to obtain a refined molten steel having predetermined inclusion characteristics;
   a vacuum degassing step S3, comprising
      subjecting the refined molten steel obtained in step S2 to a vacuum degassing treatment to remove hydrogen and oxygen from the refined molten steel;
   a continuous casting step S4, comprising
      after vacuum degassing the refined molten steel in step S3, hanging the molten iron ladle into a continuous casting ladle,
      performing slag discharge detection, and
      performing a continuous casting process,
      wherein during said continuous casting process,
         long nozzle inert gas protection and submerged nozzle protection are implemented,
         tundish inert gas protection is implemented,
         tundish covering slag is utilized,
         continuous temperature measurement is implemented,
         casting protection with a crystallizer pre-melted slag is implemented, automatic liquid level control is implemented,
crystallizer electromagnetic stirring is implemented,
water dynamic control is implemented in a secondary cooling zone,
end section electromagnetic stirring is implemented, and
a continuous casting blank is obtained at a constant temperature falling within the range of 1500-1600° C. and at a constant pulling rate falling within the range of 0.20~0.28 m/min;
wherein the tundish covering slag is a tundish covering agent and its main components include magnesium oxide, silicon dioxide, and silicon oxide; and
wherein the continuous casting step S4 is performed in a manner such that a shrinkage cavity of the continuous casting blank obtained in the step S4 is not greater than 1.0 grade; and
an electroslag remelting step S5, comprising
placing the continuous casting blank obtained in step S4 into a gas-shielded electroslag furnace having a gas protection device,
charging a protective gas from the gas protection device,
adding a slag charge, and
igniting, smelting, and feeding after slag melting so as to obtain said purified steel; wherein
a melting rate of the smelting in step S5 is in the range of 12-15 kg/min;
the slag charge added during said electroslag remelting in the step S5 is a binary slag system composed of Ca compounds and Al compounds; and
the protective gas charged in the step S5 is argon gas or nitrogen gas;
the steps S1 through S5 being conducted such that the chemical components of the purified steel, in terms of mass percentage, are C: 15~0.19%, Si≤0.4%, Mn: 0.5~0.7%, P≤0.012%, S≤0.006%, Cr: 1.5~1.8%, Mo: 0.28~0.35%, Ni: 1.4~1.7%, Al: 0.02~0.04%, and the balance is Fe and unavoidable impurities.

2. The smelting method for producing purified steel according to claim 1, wherein the molten iron in step S1 is desulfurized using KR desulfurization equipment before being added into the converter, and the mass percentage of sulfur in the desulphurized molten iron produced thereby is less than or equal to 0.003%.

3. The smelting method for producing purified steel according to claim 1, wherein a mass percentage of the molten iron in the raw material used in step S1 is 80-90%, and the balance is scrap steel.

4. The smelting method for producing purified steel according to claim 3, wherein the scrap steel used as raw material in step S1 has impurities, by mass percentage, of As≤0.04%, Sn≤0.03%, Pb≤0.002%, Sb≤0.005%, Cu≤0.20%, Ti≤0.0005%; and
the scrap steel meets a radiation less than or equal to 0.15 μSv/h or a radioactivity less than or equal to 0.1 Bq/g.

5. The smelting method for producing purified steel according to claim 1, wherein a mass percentage of Ti in the primary molten steel obtained in step S1 is less than or equal to 0.002%, and a mass percentage of Ca in the primary molten steel obtained in step S1 is less than or equal to 0.001%.

6. The smelting method for producing purified steel according to claim 1, wherein grades of inclusions in the refined molten steel obtained in step S2 reach A fine less than or equal to 1.5 grade, A coarse less than or equal to 0.5 grade, B fine less than or equal to 1.0 grade, B coarse less than or equal to 0.5 grade, C fine equal to 0 grade, C coarse equal to 0 grade, D fine less than or equal to 1.0 grade, D coarse less than or equal to 1.0 grade, and DS less than or equal to 1.0 grade.

7. The smelting method for producing purified steel according to claim 1, wherein the vacuum degassing treatment in step S3 utilizes RH vacuum cycle degassing to achieve a degree of vacuum less than or equal to 67 Pa; and
after the vacuum degassing treatment, a mass percentage of hydrogen in the molten steel is less than 1.0 ppm and a mass percentage of oxygen in the molten steel is less than or equal to 5.0 ppm.

8. The smelting method for producing purified steel according to claim 1, wherein the grades of internal inclusions of the continuous casting blank are class A inclusions less than or equal to 1.5 grade, class B inclusions less than or equal to 1.0 grade, class C inclusions less than or equal to 0.5 grade, and class D inclusions less than or equal to 1.0 grade.

9. The smelting method for producing purified steel according to claim 1, wherein the binary slag system used in step S5 is a $CaF_2$ and $Al_2O_3$ slag system, with a mass ratio of $CaF_2$ and $Al_2O_3$ being 7:3.

10. The smelting method for producing purified steel according to claim 1, wherein the protective gas charged in step S5 is argon gas.

* * * * *